United States Patent [19]

Unger

[11] Patent Number: 4,461,057
[45] Date of Patent: Jul. 24, 1984

[54] HANDLE BAR FORMED AS TELESCOPIC TUBE

[76] Inventor: Henry M. Unger, 24, Sunset Dr., Weston, Conn. 06880

[21] Appl. No.: 383,378

[22] Filed: May 28, 1982

[30] Foreign Application Priority Data

Jun. 4, 1981 [DE] Fed. Rep. of Germany ....... 3122103

[51] Int. Cl.³ ................................................ B25G 1/04
[52] U.S. Cl. ..................................... 16/114 R; 16/115; 16/DIG. 25; 16/DIG. 41; D8/107
[58] Field of Search ............. 16/110 R, 111 R, 114 R, 16/115, DIG. 24, DIG. 25, DIG. 39, DIG. 41; 74/544, 546, 551.3, 551.9, 557, 551.4, 551.5, 551.7; D4/11; D8/107, 303; 403/343, 342, 349, 104; 285/340, 341

[56] References Cited

U.S. PATENT DOCUMENTS

| | | | |
|---|---|---|---|
| 429,067 | 5/1890 | Simmons | 403/343 |
| 690,797 | 1/1902 | Vail | 285/341 X |
| 1,030,387 | 6/1912 | Critton | 403/343 X |
| 1,252,632 | 1/1918 | Voje | 16/110.5 |
| 1,311,145 | 7/1919 | Zeindler et al. | 403/343 X |
| 1,565,070 | 3/1924 | Edwards | 403/343 X |
| 1,671,458 | 5/1928 | Wilson | 403/343 |
| 1,889,870 | 12/1932 | Montgomery | 285/340 X |
| 1,903,926 | 4/1933 | Lamont | 285/340 |
| 2,091,458 | 8/1937 | Sleight | 16/110 R X |
| 2,405,489 | 8/1946 | Brock | 285/340 |

FOREIGN PATENT DOCUMENTS 2069914  9/1981  United Kingdom ................. 16/115

*Primary Examiner*—Fred Andrew Silverberg
*Assistant Examiner*—Christopher T. Yu
*Attorney, Agent, or Firm*—John C. Smith, Jr.

[57] ABSTRACT

An extensible handle bar for cleaning and painting tools and the like comprises inner and outer tubes in slidable telescoping relationship, the outer tube having a pair of apertures therein containing inserts. A helically threaded nut extends over the exterior surface of the outer tube and the inserts. The outer surface of each of the inserts includes projecting thread segments which mate with the internal threads of the nut. The internal threads of the nut and the thread segments of the insert each have a conical configuration. Upon rotation of the nut in one direction on the outer tube, the inserts are depressed radially such that the inner surfaces of the inserts press against the outer surface of the inner tube to axially lock the inner and outer tubes together.

4 Claims, 6 Drawing Figures

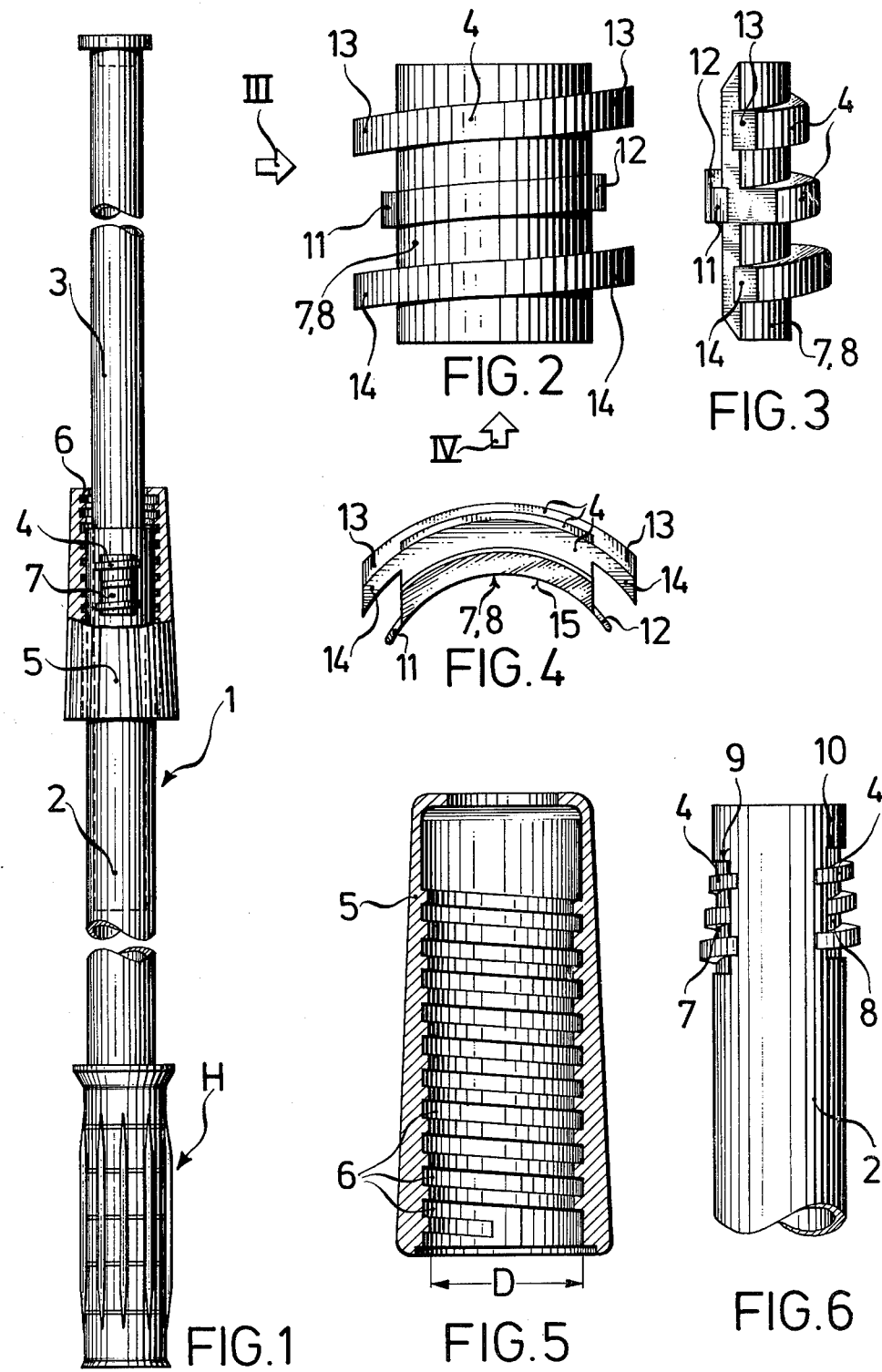

HANDLE BAR FORMED AS TELESCOPIC TUBE

BACKGROUND OF THE INVENTION

This invention relates to a handle bar formed as a telescopic tube, the tubes of which except for the innermost tube are provided at their one ends with external threads produced on an insert or body consisting of thermoplastic material, said body passing through apertures or cutouts in the wall of the tube, a sleeve-like threaded nut being guided on the body such that when tightening the threaded nut the portion of the body projecting into the interior of the tube is pressed against the wall of the tube to be clamped tight.

Handle bars having such a clamp device are known and are used for instance for cleaning devices such as brushes, foams or the like or for tools for applying for instance paint, in order to be able to perform cleaning or painting work located at high levels from ground or floor.

In a conventional handle bar formed as a telescopic tube, the body of the clamp device is formed annularly and provided with cylindrical external threads. It has at one of its edges a plurality of radially arranged extensions in the form of elongate arms which are subject to a bias and have a thickened portion at their free ends at the back side with which the arms pass through cutouts in the wall of the tube carrying the body. The threaded nut provided with cylindrical threading and guided on the external threads of the body forms a taper adjacent to its threads by means of which when the threaded nut is tightened down the thickened portions of the arms of the body are urged radially against the wall of the tube to be clamped tight in such a way that the tube is clamped.

Such handle bars have a substantial disadvantage to the effect that the exchanging of the annular body upon wear is rendered difficult because before the resilient arms of the body must be disengaged from the cutouts in the wall of the tube, which is possible only by means of a suitable tool. Such a tool, however, generally is not available for the purchaser of the handle bar. Furthermore, an ejection of the threaded nut from the injection-molding machine is rendered difficult by the taper adjacent to the threads of the threaded nut. Furthermore, the material demand required for the production of the annular body by the arrangement of the arms is relatively large. The same applies for the production of the threaded nut as a result of the present configuration thereof.

SUMMARY OF THE INVENTION

It is, therefore, an object of the present invention to avoid the above-mentioned disadvantages and to simplify the clamp device for a handle bar formed as telescopic tube of the species described hereinbefore, to improve same and to reduce the material demand required for the production thereof.

To attain this object the present invention provides a handle bar formed as a telescopic tube and having an innermost and outer tubes which except for the innermost tube are provided at one of their ends with external threads produced on an insert or body consisting of thermoplastic material, said body passing through apertures or cutouts in the wall of the tube, a sleeve-like threaded nut being guided thereon such that when tightening the threaded nut the portion of the body projecting into the interior of the tube is pressed against the wall of the tube to be clamped tight, wherein the external threads of the respective tube provided therewith consist of threaded portions, the thread convolutions of each threaded portion being produced at a body conformed to the rounding of the tube, said body projecting in passing through the cutout in the wall of the tube associated therewith relative to the internal surface of said wall; each body possesses two nose-like projections having self-resiliency and arranged opposite to one another which grip behind the cutout in the tube, and at least one thread convolution extends with its ends beyond the cutout, and the external threads of the threaded portions and the threads of the threaded nut are conical.

As a result of the configuration of the clamp device proposed by the invention, the bodies provided with threaded portions are able to be disengaged from the cutouts in the wall of the individual tubes by a simple finger pressing on the concave side thereof. The bodies are secured in the cutouts by the nose-like projections on the one hand and the thread convolutions of the threaded portions extending with their ends beyond the cutouts, on the other hand. Furthermore, the clamping of the respective inner tube in the outer one is substantially improved in that when tightening the threaded nut the inserts or bodies provided with threaded portions are urged with their entire rearward surfaces against the wall of the inner tube to be clamped tight. Much less material is required than in prior art devices for the production of the inserts or bodies provided with threaded portions. Also, for the production of the threaded nut less material is required because by an omission of the taper required in prior art devices the portion of the wall of the threaded nut adjacent to the threads is able to be made thinner. By the omission of the taper, the ejection of the threaded nut from the injection-molding machine is furthermore facilitated.

An advantageous embodiment of the handle bar proposed by the invention is one in which the internal diameter of the threads of the threaded nut is cylindrical and the threaded nut is guided with a slight clearance on the tube provided with external threads.

Thereby, the stability of the internested tubes of the handle bar is enhanced in the region of clamping.

BRIEF DESCRIPTION OF THE DRAWING

An embodiment of the invention will now be described by way of example and with reference to the accompanying drawing in which:

FIG. 1 is an elevational view, partly in section, of two telescoped tubes of a partially illustrated handle bar according to the invention interlocked at their neighboring ends by a threaded nut;

FIG. 2 is an elevation of an insert or body provided with a threaded portion;

FIG. 3 is a side-elevational view in the direction of the arrow III of the body of FIG. 2;

FIG. 4 is an elevational view of the body in the direction of the arrow IV of FIG. 2;

FIG. 5 is a longitudinal section of the threaded nut, and

FIG. 6 is an elevational view of a partially illustrated tube.

DESCRIPTION OF THE PREFERRED EMBODIMENT

FIG. 1 shows a handle bar 1 formed as telescopic tube and two internested tubes 2 and 3 of the handle bar 1. The handle bar 1 is provided with a sleeve-shaped handle H of rubber or thermoplastic material pushed tightly onto the rear end of the tube 2. The tube 2 is provided with tapered external threads 4 at its end remote from the handle H, on which threads there is guided a sleeve-shaped threaded nut 5 having tapered threads 6 and consisting of thermoplastic material. The tapered threads 6 are cylindrical internally so that the internal diameter D of the threaded nut 5 is uniform. The threaded nut 5 is guided with close tolerance on the tube 2. The external threads 4 consist of two threaded portions which are produced on two rectangular inserts or bodies 7 and 8 consisting of thermoplastic material. The bodies 7 and 8 are conformed to the internal rounding of the tube 2. They are located in two opposing apertures or cutouts 9 and 10 in the wall of the tube 2 such that they project with their concave sides 15 relative to the internal surface of the wall of the tube 2. Each body 7 and 8 has at its longitudinal edges two opposing nose-like projections 11 and 12 with self-resiliency corresponding to the curvature of the bodies 7 and 8, said projections being integral with the body 7 and 8, respectively (FIGS. 3 and 4). The projections 11 and 12 grip behind the apertures or cutouts 9 and 10, respectively, in the wall of the tube 2. Furthermore, two thread convolutions of the threaded portions extend with their ends 13 and 14 beyond the apertures or cutouts 9 and 10, respectively, in the wall of the tube 2 (FIG. 1).

For assembly, the bodies 7 and 8 are urged into the cutouts 9 and 10 in the wall of the tube 2 so far that the nose-like projections 11 and 12 engage the interior surface of the outer tube 2 adjacent the cutouts 9 and 10 and two thread convolutions of the threaded portions of each insert or body 7 and 8 engage externally with their ends 13 and 14 at the external surface of the tube 2. The projections 11 and 12 and the two thread convolutions thereby seclude the wall of the tube 2 between each other, thereby a reliable attachment of the bodies 7 and 8 in the apertures or cutouts 9 and 10 being ensured. By simply pressing one's finger against the concave side of the inserts or bodies 7 and 8, they disengage from the apertures or cutouts 9 and 10 in the wall of the tube 2 as a result of the flexibility of the nose-like projections 11 and 12, after the threaded nut 5 has before been released from the inserts or bodies 7 and 8.

The handle bar 1 substantially consists of an outer tube 2, an inner tube 3 having a slightly smaller diameter than the outer tube 2 and being introduced into the outer tube 2, and a sleeve-shaped threaded nut 5 which is arranged on the end of the outer tube 2 and engages the external thread segments on the inserts 4 in the apertures of the outer tube. The inner tube 3 is axially slidable in the outer tube 2 such that the length of the handle bar 1 can be adjusted. When the threaded nut 5 is tightened by rotation in a clockwise direction, a clamping effect occurs between the outer tube 2 and the external wall of the inner tube 3. The conical internal threads 6 of the threaded nut 5 are pressed against the conical thread segments 4 of the inserts 7, 8 and the latter are pressed against the inner tube 3. Thus, a positive connection is achieved between the outer tube 2 and the inner tube 3 by means of the threaded nut 5 and the inserts 7, 8. By rotating the threaded nut 5 in the opposite direction, counterclockwise, this positive connection is released so that the inner tube 3 may be slid again in the outer tube 2.

The invention may be embodied in other specific forms without departing from the spirit or essential characteristics thereof. The embodiment is therefore to be considered in all respects as illustrative and not restrictive.

What is claimed is:

1. An extensible handle bar for tools, such as cleaning and painting tools, comprising
   (a) an inner cylindrical walled tube and an outer cylindrically walled tube, said inner tube slidably telescoping within said outer tube;
   (b) at least one aperture in a wall of said outer tube adjacent one end thereof;
   (c) an insert positioned in said at least one aperture, said insert having an inner surface confronting an outer surface of said inner tube and an outer surface opposite said inner surface;
   (d) resilient means for retaining said insert in said at least one aperture; and
   (e) a sleeve-like internally helically threaded nut extending over an exterior surface of said outer tube and said at least one aperture and said insert positioned therein;
   (f) said outer surface of said insert comprising a plurality of thread segments projecting radially beyond the exterior surface of said outer tube and mating with the internal threads of said nut;
   (g) at least one of said internal threads of said nut and said thread segments of said insert has a conical configuration;
   (h) whereby rotation of said nut in one direction on said outer tube will cause said insert to be depressed radially and said inner surface of said insert to press against said outer surface of said inner tube to axially lock said inner and outer tubes together.

2. An extensible handle bar as defined in claim 1 wherein said outer tube has two apertures, each having said insert therein.

3. An extensible handle bar as defined in claim 1 wherein said resilient retaining means comprises resilient projections on said insert for engaging an interior surface of said outer tube adjacent said apertures and extensions of said thread segments on said outer surface of said insert which engage the exterior surface of said outer tube adjacent said aperture.

4. An extensible handle bar as defined in claim 1 wherein said internal threads of said nut and said thread segments of said insert each have a conical configuration.

* * * * *